March 10, 1942.   E. M. BERNDT   2,275,497
DRIVING CONNECTION FOR FILM-HANDLING APPARATUS
EMPLOYING REMOVABLE FILM MAGAZINES
Filed Sept. 21, 1938   3 Sheets-Sheet 1

Eric M. Berndt
INVENTOR

March 10, 1942.    E. M. BERNDT    2,275,497
DRIVING CONNECTION FOR FILM-HANDLING APPARATUS
EMPLOYING REMOVABLE FILM MAGAZINES
Filed Sept. 21, 1938    3 Sheets-Sheet 2
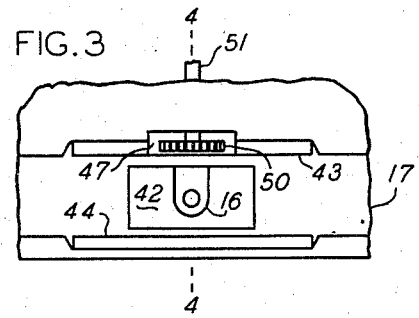
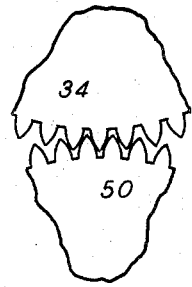
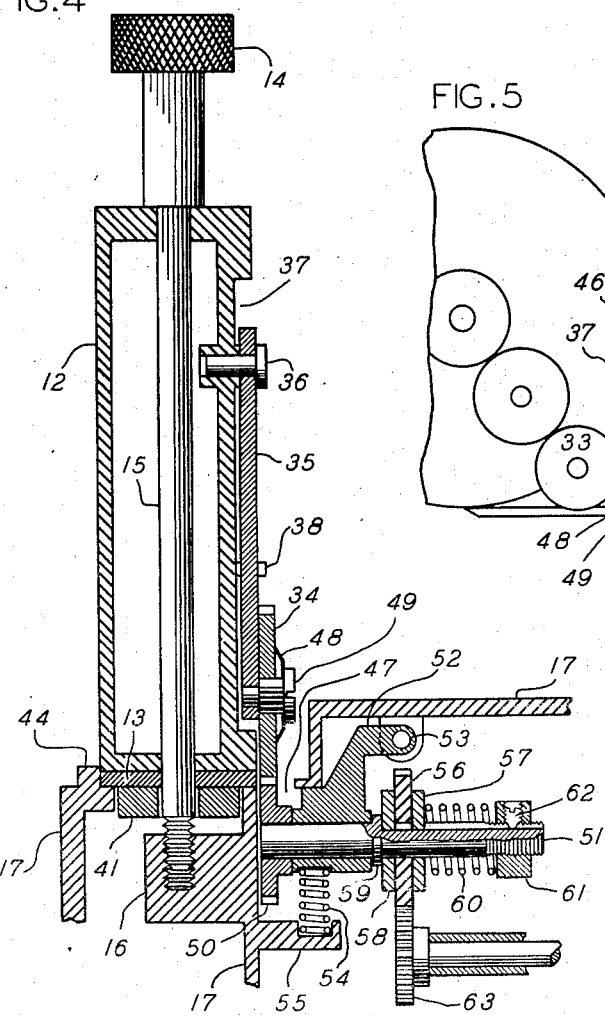
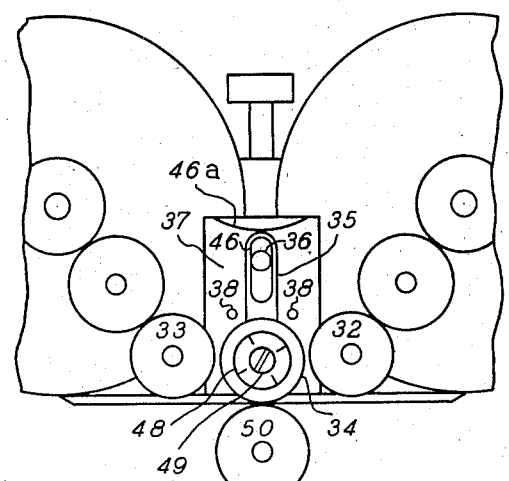
INVENTOR
Eric M. Berndt.

March 10, 1942.  E. M. BERNDT  2,275,497
DRIVING CONNECTION FOR FILM-HANDLING APPARATUS
EMPLOYING REMOVABLE FILM MAGAZINES
Filed Sept. 21, 1938  3 Sheets-Sheet 3
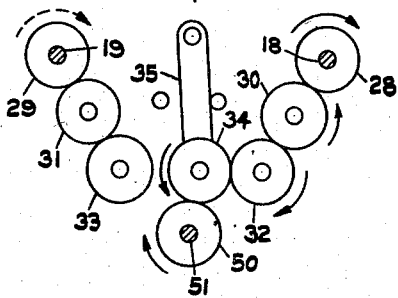
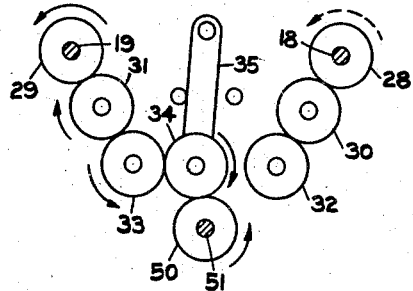
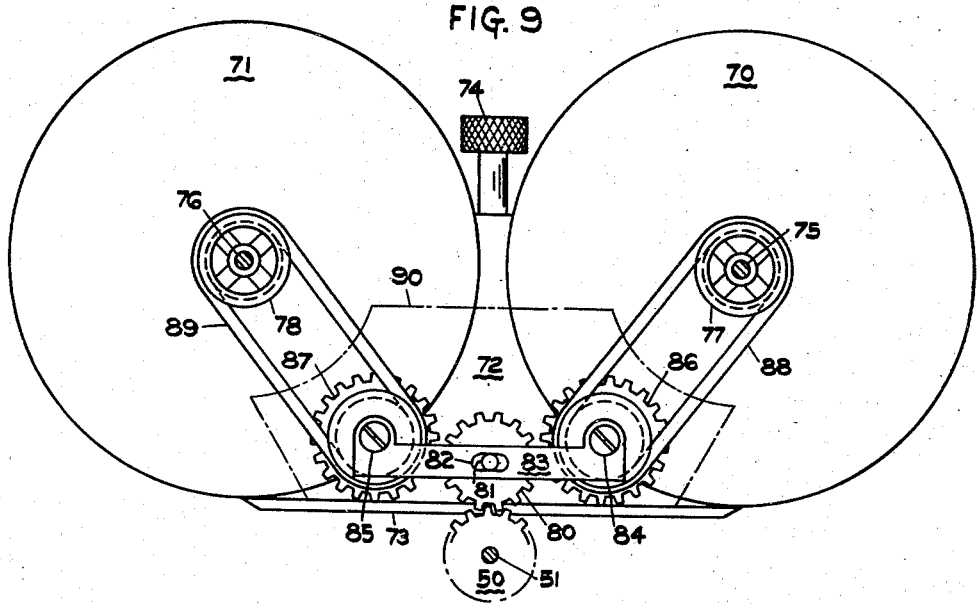
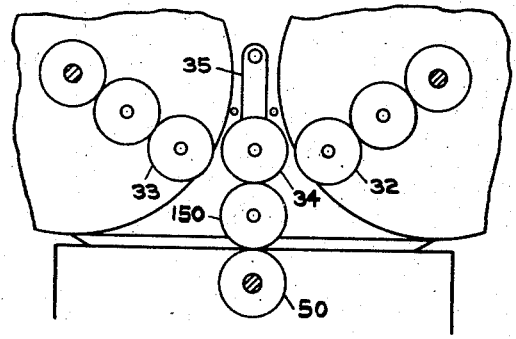
INVENTOR
ERIC M. BERNDT
BY *Otto J. Nathansohn*
AGENT Patented Mar. 10, 1942

2,275,497

UNITED STATES PATENT OFFICE 2,275,497

DRIVING CONNECTION FOR FILM-HANDLING APPARATUS EMPLOYING REMOVABLE FILM MAGAZINES

Eric M. Berndt, New York, N. Y., assignor, by mesne assignments, to J. A. Maurer, Inc., a corporation of New York Application September 21, 1938, Serial No. 231,030

35 Claims. (Cl. 242—55)

This invention relates to driving connections for film-handling apparatus employing removable film magazines, for example, motion picture cameras and sound recorders. A removable film magazine contains as a rule two spindles which carry film rolls. The film, after having been loaded on one spindle, is unwound from this feed or supply spindle, passes through the film-handling apparatus wherein it is handled, for example, exposed to the action of light, and then is wound or taken up on the other spindle, the take-up spindle.

A common way of establishing a driving connection in such apparatus is to drive the take-up spindle by means of a belt passing over a pulley mounted on the take-up spindle and usually placed on the outside of the magazine; the belt being driven by a suitable actuating mechanism associated with the film-handling apparatus. One disadvantage of this arrangement is the fact that when a magazine is to be attached to the apparatus, it is necessary for the operator to take the belt, hanging loose from the apparatus, and place it over the pulley. In the course of rapid work, the operator may easily forget to attach the belt when changing magazines. The result is that, after operation has been started, the film is not taken up, but accumulates in the apparatus, where it jams, stopping the apparatus and sometimes even breaking delicate parts of its mechanism.

For making double exposures, or for trick work of other sorts, or for other purposes, it is often desirable to wind the film back in the apparatus, and for that purpose it is customary to provide a pulley also on the feed spindle of the magazine. Hence, in order to wind the film back, the operator must not only reverse the actuating mechanism, but must also shift the belt from the normal take-up pulley to the normal feed pulley, and when he is ready to resume ordinary operation, the belt must be shifted back again. This repeated shifting of the belt in addition to reversing the actuating mechanism is another drawback of the belt-driven arrangement.

An object of the invention is to obviate the disadvantages that are inherent in the belt-driven arrangement. Another object is to provide a removable film magazine, the mere attachment of which to the film-handling apparatus establishes driving connection between the spindles rotatably supported by the magazine and the reversible actuating mechanism associated with the apparatus. A further object is to provide in film-handling apparatus employing removable film magazines an improved, efficient, and quiet-running combination of elements, whereby selective driving connection may be established between the actuating mechanism associated with the apparatus and either of a pair of spindles rotatably supported by a removable magazine, the selection being determined solely by the direction in which the actuating mechanism is operated, so that either spindle may serve as take-up spindle if desired.

To accomplish these objects, the removable film magazine and the film-handling apparatus each rotatably support a gear, and these two gears are so placed that they mesh with each other when the magazine is attached to the apparatus. Furthermore, there are rotatably supported by the magazine a pair of gears, each of which is in driving connection with one of the spindles, and a shiftable gear which is adapted to mesh with one of the two gears at one end and with the other gear at the other end of its shift, and which shifts automatically when the actuating mechanism is reversed. For that purpose, the one of the two first mentioned gears which is rotatably supported by the magazine may be shiftably mounted, but the invention may be carried out in various manners, as will be apparent from the following description.

It is understood that other driving connections than the belt have previously been used or suggested. But these have been relatively complicated and expensive mechanisms involving separate shaft couplings and separate ratchet devices, overrunning clutches, or the like, for each spindle to provide driving connection upon the attachment of the magazine and take-up in the normal or reverse directions respectively. Accordingly, a further object of the invention is to provide a simple driving connection for film-handling apparatus employing removable film magazines, which is cheaper in manufacture, more dependable in operation, and generally more satisfactory than arrangements known heretofore.

Other objects and advantages include those which are hereinafter stated or apparent or which are incidental to the invention. The invention will be better understood when the following description is considered with the accompanying drawings of several embodiments thereof set forth by way of example, and its scope will be pointed out in the appended claims.

In the drawings,

Fig. 3 is an elevation of a part of the casing of a film-handling apparatus.

Fig. 4 is an enlarged section on lines 4—4 of Figs. 2 and 3, including in like section certain associated parts of a film-handling apparatus.

Fig. 5 shows a modified detail of Fig. 2.

Fig. 6 shows another modified detail of Fig. 2.

Figs. 7 and 8 are diagrammatic views of the moving parts shown in Fig. 2, illustrating two different conditions of operation.

Fig. 9 is a side elevation of another removable film magazine according to the invention and of an associated gear in a film-handling apparatus.

Fig. 10 is a diagram of a modification of Fig. 2.

Figure 1:
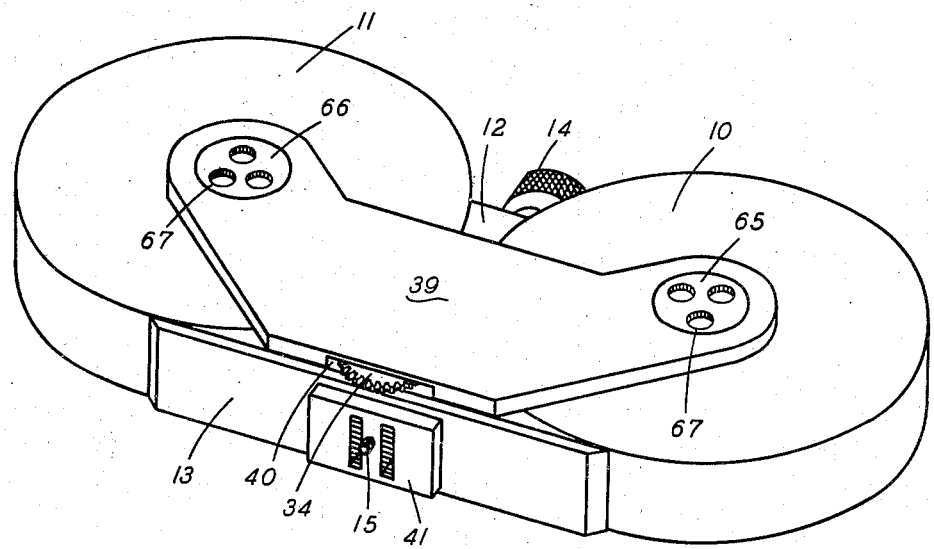
Fig. 1 is a perspective view of a removable film magazine according to the invention.

Referring first to Figs. 1 to 8, the removable film magazine may have two portions 10 and 11, each housing a film roll, and a central portion 12, connecting the roll housing portions. Also, it may have a base 13 shaped to fit against the film-handling apparatus when the magazine is attached to it by tightening suitable fastening means, for example, by turning a thumbscrew 14 so as to bring its threaded shank 15 into engagement with a correspondingly threaded aperture or socket 16 in the adjacent portion of the casing 17 of the film-handling apparatus (Fig. 4). Centered in and rotatably supported by each of the portions 10 and 11 are spindles 18 and 19, which may be conveniently alike and provided, inside of the magazine, with the customary hub and key arrangement for carrying the cores on which the film is wound.

Figure 2:
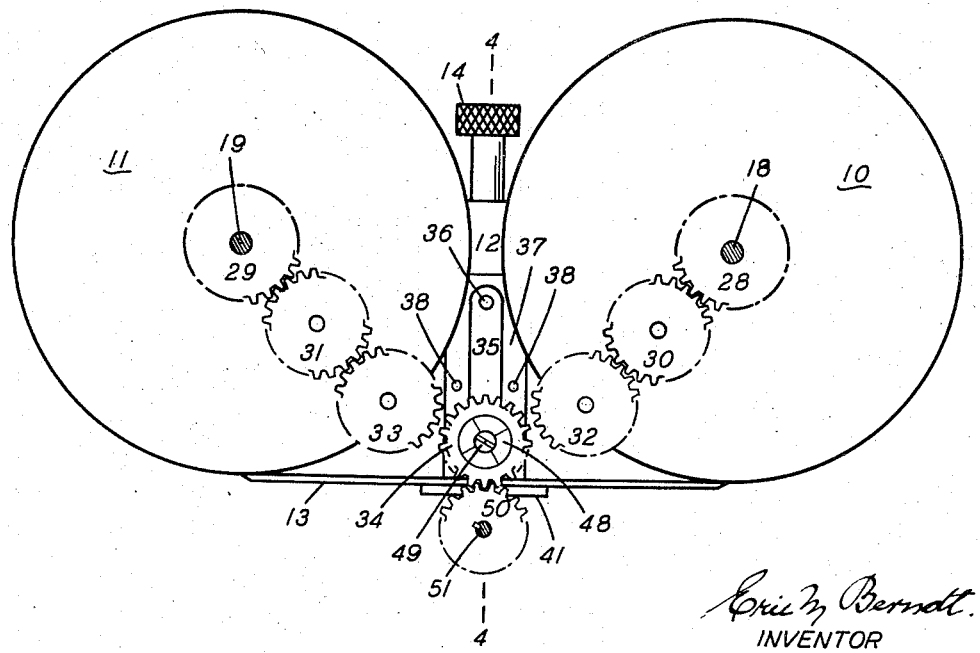
Fig. 2 is a side elevation of the same magazine but with a cover plate and two rotating disks removed, and of an associated gear in a film-handling apparatus.

Each of the spindles 18, 19, has associated with it a train of gears 28, 30 and 32, and 29, 31 and 33 respectively, which are conveniently placed on the outside of the magazine, as shown in Fig. 2. Gears 28 and 29 are pinned to spindles 18 and 19 respectively, whereas gears 30 to 33 are mounted for rotation on the magazine. In its train gear 28 meshes with the adjacent gear 30, which in turn meshes with gear 32, and correspondingly gear 29 meshes with gear 31, and gear 31 with gear 33. The two gear trains extend from the spindles 18 and 19 toward the base 13 of the magazine and toward each other in such a manner that the terminal gears 32 and 33 are still somewhat apart. Placed between gears 32 and 33 is a gear 34, which is rotatably carried by an arm 35. Arm 35 is pivoted to the magazine at a point 36 of the central portion 12, and swings in a recess 37 therein so that gear 34 shifts in the plane of gears 32 and 33. By virtue of this arrangement, gear 34 is shiftable and adapted to mesh with gear 32 and be clear of engagement with gear 33 at one end of its shift, and to mesh with gear 33 and be clear of gear 32 at the other end of its shift. Stops 38, 38, may be provided on both sides of arm 35 to limit its swing when gear 34 is appropriately in mesh with either gear 32 or gear 33, and so to prevent binding.

To protect the gearing 28 to 38 against dirt, dust, and the like, a cover plate 39 may be fitted flatwise against the magazine and be provided with an opening 40 through which gear 34 protrudes slightly (Fig. 1).

A block 41, shown in Figs. 1, 2, and 4, may be mounted in the center of base 13. It may have appropriate apertures through which the film may enter and leave the film-handling apparatus, and a hole through which the shank 15 of thumbscrew 14 may pass, and it may serve to locate the magazine on the apparatus. In its turn, the casing 17 of the apparatus may have an opening 42 adapted to receive block 41 when the magazine is put in position on the apparatus (Figs. 3 and 4). Guide rails 43 and 44 may also serve to locate the magazine, and socket 16 may extend into opening 42 so as to receive shank 15 of thumbscrew 14. A slot 47 permits shiftable gear 34 to mesh with the driving gear 50, which is mounted within casing 17 and fixed to shaft 51, and which transmits to gear 34 drive from the actuating mechanism associated with the apparatus.

Since on attachment of the magazine the teeth of shiftable gear 34 initially may abut on rather than engage the teeth of driving gear 50, it is desirable to make provision for insuring that gears 34 and 50 will finally fit into mesh with each other. This may be achieved by yieldingly mounting either gear 34 or gear 50. Driving gear 50 may be yieldingly mounted, for example, as shown in Fig. 4, by journalling shaft 51 in a support block 52, which is pivoted at 53 to the casing 17 of the film-handling apparatus. A spring 54, resting upon an extension 55 of the casing 17, urges support block 52, and consequently gear 50, toward gear 34. If now gear 34 does not fit immediately into mesh with gear 50, the latter yields as the magazine is attached, and, subsequently, spring 54 urges gear 50 into mesh with gear 34 upon slight rotation of either.

Alternatively, shiftable gear 34 may be yieldingly mounted, for example, as shown in Fig. 5. There, arm 35 is provided with a slot 46 at the point 36 where it is pivoted to the magazine, and a spring 46a set against one side of the suitably shaped recess 37, urges arm 35, and consequently gear 34, toward gear 50.

Another way of insuring that gears 34 and 50 fit into mesh with each other is to give to their teeth such a shape that they automatically slide into meshing position if they happen to abut on each other, for example, by making them pointed, as shown in Fig. 6.

If after the magazine has been attached to the film-handling apparatus, the actuating mechanism is started so as to rotate driving gear 50 through shaft 51 in a clockwise direction, shiftable gear 34 automatically shifts to the right into mesh with gear 32 (if it is not already in that position). Driving connection is thus established through gears 34, 32, 30, and 28, between driving gear 50 and spindle 18, and spindle 18 is rotated in a clockwise direction, so that it takes up film loaded on spindle 19 and threaded through the film-handling apparatus. At the same time, gear 34 is entirely clear of gear 33, so that spindle 19 is free to rotate and to unwind film. The parts are thus disposed and operating as shown in Fig. 7.

If now it is desired to wind film in the opposite direction, all that the operator need do, so far as the take-up is concerned, is to reverse the actuating mechanism, whereupon driving gear 50 is rotated in a counterclockwise direction. Upon such reversal of the direction of rotation of gear 50, shiftable gear 34 automatically shifts from its right-hand to its left-hand position into mesh with gear 33, and gear 32 is left clear. Through gears 34, 33, 31, and 29, driving connection is now established between driving gear 50 and spindle 19 so as to rotate spindle 19 in a counter-clockwise direction. The film is now taken up on spindle 19, and spindle 18 is free to unwind film; the condition of the parts being as shown in Fig. 8.

When either spindle 18 or spindle 19 is feeding, the associated gear train rotates and, by reason of its frictional loss, provides a slight drag on the feeding spindle. This drag beneficially counteracts any tendency of that spindle to spin and to unwind film too quickly, whereby the film might jam and be scratched or otherwise injured inside of the film-handling apparatus. Thus, special devices for the prevention of spinning of the feeding spindle can be dispensed with.

As stated previously, shiftable gear 34 is rotatably carried by arm 35 and, hence, when in a central position at the start of the drive, as shown in Fig. 2, might simply rotate and not shift to the desired position. Provision, therefore, must be made that gear 34 begins to turn only after it has fitted into mesh with either gear 32 or 33, for example, by placing a spring friction washer 48 under the head of the screw 49 by which gear 34 is rotatably mounted on arm 35 (Figs. 2, 4, and 5).

Gears 28 to 34 and gear 50 are shown in Fig. 2 as being all the same size. This arrangement has proved satisfactory in practice. However, the number, size, and other characteristics of gears 28 to 34 and 50 may be varied as desired, and will depend chiefly upon the dimensions and arrangement of the magazine and upon the speed at which drive is to be transmitted to spindles 18 and 19 from the actuating mechanism. Furthermore, gear 32 and spindle 18, and gear 33 and spindle 19, need not be in driving connection through gears 30 and 28, and gears 31 and 29, respectively, but may be connected through a belt arrangement, for example, such as is shown in Fig. 9, which shows also in other respects a modification of the removable film magazine according to the invention, and will be explained hereinafter.

Since the film must ordinarily travel through the film-handling apparatus with constant speed, the rate of rotation of the take-up spindle must decrease as the film builds up on this spindle in order to maintain a constant peripheral film speed. In the commonly used belt-driven arrangement, this variation in speed is achieved by permitting the belt to slip, either by using a resiliently mounted tightening idler for a non-extensible belt, or by using a belt made, for example, of coiled spring wire so that it will stretch and slip when needed. Either of these expedients for getting the slippage required may be employed when the belt arrangement shown in Fig. 9 is used. Another way of adapting both spindles 18 and 19 to receive slipping drive if desired is to mount to each spindle 18, 19, any suitable clutch that will allow for slippage.

In a presently preferred embodiment of the invention, however, a single adjustable clutch is so arranged that slipping drive is provided for spindle 18, or spindle 19, whichever it is desired to use as a take-up spindle. As shown in Fig. 4, a gear 56 is rotatably mounted on shaft 51 and has at each side washers 57 and 58, each keyed to shaft 51. Washer 58 is fixed against longitudinal displacement on shaft 51, for example, by setting it against a flange 59 thereon, whereas washer 57 is slidable along the shaft. That face of washer 57 which is away from gear 56 is engaged by a spring 60, held in compression against the assembly of gear 56 and washers 57, 58, by a collar 61 adjustably secured to shaft 51 with a set-screw 62, or the like. Gear 56 is engaged by a gear 63, which may be suitably connected to receive drive from the actuating mechanism associated with the film-handling apparatus. In case driving gear 50 is yieldingly mounted as described above in connection with Fig. 4, the relation of gear 56 to gear 63 may conveniently be such that they will remain in driving engagement despite such displacement of support block 52 about its pivot 53 as may be encountered in the attachment of the magazine.

In this manner, a single clutch may provide slippage for either of the spindles of each of a plurality of removable film magazines which may be attached to the film-handling apparatus in succession, and thus manufacture of the magazines is simplified and cheapened. Moreover, the particular slipping clutch described in connection with Fig. 4 has proved dependable in practice, and has the advantage of being readily adjustable, either initially or even from time to time if required, so as to increase or decrease the friction between its working elements.

The drive for gear 63, or for shaft 51 if the single slipping clutch described above is not employed, is advantageously derived from the principal motor or other actuating mechanism of the apparatus (not shown) so that the film take-up will be appropriately timed and synchronized with the operation of other film-handling and working parts.

As it is at times desirable to rotate spindle 18 or spindle 19 by hand, for example, in order to take up slack which may have been left in threading the film through the apparatus, wheels or disks 65 and 66, shown in Fig. 1, may be pinned to spindles 18 and 19 outside of gears 28 and 29. They may be provided with suitable apertures 67, 67 ... to be engaged by the fingers, and may be fitted in suitable holes in cover plate 39 in order to be accessible to the operator. When spindle 18 or 19 is driven by the actuating mechanism, disk 65 or 66 will turn around and thus indicate which spindle is being driven, the driving speed, and so forth.

It will thus be seen that, when the removable film magazine is attached to the film-handling apparatus, selective driving connection is established between the actuating mechanism associated with the apparatus and either spindle 18 or spindle 19, rotatably supported by the magazine; the selection being determined solely by the direction in which the actuating mechanism is operated. This result is achieved by a simple, efficient, and reliable combination of elements, which consists essentially of the driving gear 50 rotatably supported by the apparatus, and the shiftable gear 34 and the adjacent driven gears 32, 33, rotatably supported by the magazine. These four gears are so arranged that shiftable gear 34 is adapted to mesh with driven gear 32 at one end of its shift when driving gear 50 is rotated in a clockwise direction and with driven gear 33 at the other end of its shift when driving gear 50 is rotated in a counterclockwise direction, and that shiftable gear 34 shifts automatically from one drive transmitting position to the other when the direction of rotation of driving gear 50 is reversed. The drive thus selectively transmitted may be made slipping if desired, and the means for making the gear 34 shift may be subjected to variations without departure from the spirit of the invention.

For example, in Fig. 9 there is shown another removable film magazine according to the invention, which may have again two film roll housing portions 70 and 71, a connecting central portion 72, and a base 73. Also, there may be provided a thumbscrew 74, the threaded shank of which may be received by a correspondingly threaded socket in the film-handling apparatus. The film-handling apparatus may be the same as is shown in Figs. 3 and 4.

Centered in each of the portions 70 and 71 are the spindles 75 and 76, to which are pinned the pulleys 77 and 78 respectively. Gear 80, fixedly mounted to shaft 81, is placed on the central portion 72 near the base 73 of the magazine. Shaft 81 may alternatively be displaced laterally along or rotate at the ends of the slot 82, provided in a bracket or the like 83, and may be supported, on the rear side of gear 80, by a corresponding recess (not shown) in the central portion 72. If desired, slot 82 and the recess in the central portion 72 may be slightly curved, as shown for slot 82 in Fig. 9. Bracket 83 is mounted to the magazine at suitable points, and the screws 84 and 85 or like mounting means may serve as shafts for the flanged gears 86 and 87, which are in driving connection with pulleys 77 and 78 through the belts 88 and 89. As has been pointed out hereinbefore, belts 88 and 89 may be made of coiled spring wire, or a resiliently mounted tightening idler may be associated with each belt in order to provide for slippage if desired. The arrangement is such that shiftable gear 80 fits into mesh with driving gear 50 when the magazine is attached to the film-handling apparatus, and that it will shift sidewise into mesh with either gear 86 or gear 87, the direction of the shift being determined solely by the direction of rotation of gear 50; the dimensions of slot 82 and of the corresponding recess in the central portion 72 being conveniently such as to allow shiftable gear 80 to mesh appropriately with either gear 86 or gear 87, but at the same time such as to limit the shift to prevent binding.

In the particular examples described in connection with Figs. 2 and 9, it is the shiftable gear (34 or 80) which meshes with the driving gear 50 when the magazine is attached to the apparatus. The invention may be carried out, however, also by locating the shiftable gear at another point in the gear train rotatably supported by the magazine. This is indicated in a diagrammatic manner and by way of example in Fig. 10. Fig. 10 shows an arrangement generally similar to that of Fig. 2 but with a gear 150 rotatably supported on the magazine so that it is in continuous mesh with shiftable gear 34 and meshes with driving gear 50 when the magazine is attached to the apparatus. As has been pointed out hereinabove, the means for making gear 34 shiftable are not restricted to the particular example shown in Fig. 10. More particularly, with gear 150 inserted between driving gear 50 and shiftable gear 34, arm 35 instead of being pivoted to the magazine as shown in Fig. 10, may be pivoted to the center of rotation of gear 150 in a manner similar to that shown in Fig. 1 of my application Serial No. 258,905, filed February 28, 1939, and assigned to the same assignee as the present application of which it is a division.

Whenever it is desired, provision may be made in the case of Fig. 10 for insuring that gear 150 and gear 50 will positively fit into mesh with each other by employing either one of the means described above in connection with Figs. 4 to 6, or any other suitable means.

The terms "gear" and "gears" as used throughout the description and in the appended claims include friction wheels as well as toothed wheels, the employment of friction wheels being indicated by way of example in Figs. 5 and 11. It is understood that friction wheels come into rolling driving contact rather than that they mesh with each other, and description and claims are to be read correspondingly.

What is claimed is:

1. In combination, a film-handling apparatus, a film magazine removably attached to said apparatus, a reversible driving gear rotatably supported by said apparatus, a driven gear meshing with said driving gear, a first gear and a second gear, and a shiftable gear in driving connection with said driven gear and adapted to mesh with said first gear at one end and with said second gear at the other end of its shift; said driven, first, second and shiftable gears rotatably supported by said magazine.

2. The combination of claim 1, in which said driving gear is yieldingly mounted.

3. The combination of claim 1, in which said driving gear and said driven gear have pointed teeth.

4. In combination, a film-handling apparatus, a film magazine removably attached to said apparatus, a reversible driving gear rotatably supported by said apparatus, a first driven gear and a second driven gear, and a shiftable gear meshing with said driving gear and adapted to mesh with said first driven gear at one end and with said second driven gear at the other end of its shift; said driven and shiftable gears rotatably supported by said magazine.

5. The combination of claim 4, in which said driving gear is yieldingly mounted.

6. The combination of claim 4, in which said shiftable gear is yieldingly mounted.

7. The combination of claim 4, in which said driving gear and said shiftable gear have pointed teeth.

8. In combination, a film-handling apparatus; a film magazine removably attached to said apparatus; a reversible actuating mechanism associated with said apparatus; a driving gear rotatably supported by said apparatus and rotated by said actuating mechanism; a driven gear meshing with said driving gear, a first spindle, a first gear in driving connection with said first spindle, a second spindle, a second gear in driving connection with said second spindle, and a shiftable gear in driving connection with said driven gear and adapted to mesh with said first gear at one end and with said second gear at the other end of its shift, said spindles and said driven, first, second and shiftable gears rotatably supported by said magazine; and means for making the drive transmitted from said actuating mechanism through said gears selectively to either said first spindle or said second spindle a slipping drive.

9. The combination of claim 8, in which said driving gear is yieldingly mounted.

10. The combination of claim 8, in which said driving gear and said driven gear have pointed teeth.

11. In combination, a film-handling apparatus; a film magazine removably attached to said apparatus; a reversible actuating mechanism associated with said apparatus; a driving gear rotatably supported by said apparatus and rotated by said actuating mechanism; a first spindle, a first driven gear in driving connection with said first spindle, a second spindle, a second driven gear in driving connection with said second spindle, and a shiftable gear meshing with said driving gear and adapted to mesh with said first driven gear at one end and with said second driven gear at the other end of its shift, said spindles and said driven and shiftable gears rotatably supported by said magazine; and means for making the drive transmitted from said actuating mechanism through said gears selectively to either said first spindle or said second spindle a slipping drive.

12. The combination of claim 11, in which said driving gear is yieldingly mounted.

13. The combination of claim 11, in which said shiftable gear is yieldingly mounted.

14. The combination of claim 11, in which said driving gear and said shiftable gear have pointed teeth.

15. In combination, a film-handling apparatus; a film magazine removably attached to said apparatus; a reversible actuating mechanism associated with said apparatus; a driving gear rotatably supported by said apparatus and rotated by said actuating mechanism; a driven gear meshing with said driving gear; a first gear and a second gear; a shiftable gear in driving connection with said driven gear and adapted to mesh with said first gear at one end and with said second gear at the other end of its shift; said driven, first, second and shiftable gears rotatably supported by said magazine; and means for making the drive transmitted from said actuating mechanism to said driving gear a slipping drive.

16. The combination of claim 15, in which said driving gear is yieldingly mounted.

17. The combination of claim 15, in which said driving gear and said driven gear have pointed teeth.

18. In combination, a film-handling apparatus; a film magazine removably attached to said apparatus; a reversible actuating mechanism associated with said apparatus; a driving gear rotatably supported by said apparatus and rotated by said actuating mechanism; a first driven gear and a second driven gear; a shiftable gear meshing with said driving gear and adapted to mesh with said first driven gear at one end and with said second driven gear at the other end of its shift; said driven and shiftable gears rotatably supported by said magazine; and means for making the drive transmitted from said actuating mechanism to said driving gear a slipping drive.

19. The combination of claim 18, in which said driving gear is yieldingly mounted.

20. The combination of claim 18, in which said shiftable gear is yieldingly mounted.

21. The combination of claim 18, in which said driving gear and said shiftable gear have pointed teeth.

22. In combination, a film-handling apparatus, a film magazine removably attached to said apparatus, a reversible driving gear rotatably supported by said apparatus, a first spindle and a second spindle rotatably supported by said magazine, and means supported by said magazine for establishing selective driving connection between said driving gear and either said first spindle or said second spindle, the selection being determined solely by the direction of rotation of said driving gear; said means including a rotatably supported driven gear meshing with said driving gear.

23. In combination, a film-handling apparatus, a film magazine removably attached to said apparatus, a reversible driving gear rotatably supported by said apparatus, a first driven gear and a second driven gear, and gear means connecting said driving gear selectively with either said first driven gear or said second driven gear, the selection being determined solely by the direction of rotation of said driving gear; said driven gears and said gear means rotatably supported by said magazine, and said gear means including a gear meshing with said driving gear.

24. In combination, a film-handling apparatus, a film magazine removably attached to said apparatus, a reversible driving gear rotatably supported by said apparatus, a driven gear rotatably supported by said magazine and meshing with said driving gear, a first spindle and a second spindle rotatably supported by said magazine, and means supported by said magazine for establishing selective driving connection between said driven gear and either said first spindle or said second spindle, the selection being determined solely by the direction in which said driven gear is rotated by said driving gear.

25. In combination, a film-handling apparatus, a film magazine removably attached to said apparatus, a reversible driving gear rotatably supported by said apparatus; a driven gear rotatably supported by said magazine and meshing with said driving gear, a first gear and a second gear rotatably supported by said magazine, and gear means rotatably supported by said magazine and connecting said driven gear selectively with either said first gear or said second gear, the selection being determined solely by the direction in which said driven gear is rotated by said driving gear.

26. In combination, a film-handling apparatus, a film magazine removably attached to said apparatus, a reversible driving gear rotatably supported by said apparatus, a first driven gear and a second driven gear rotatably supported by said magazine, and means supported by said magazine for establishing selective driving connection between said driving gear and either said first driven gear or said second driven gear, said means including an arm swinging at one end around a pivot and a third driven gear rotatably supported at the other end of said arm, said third driven gear meshing with said driving gear and being adapted to mesh with said first driven gear at one end and with said second driven gear at the other end of the swing of said arm, and said arm swinging automatically when the direction of rotation of said driving gear is reversed.

27. In combination, a film-handling apparatus, a film magazine removably attached to said apparatus, a reversible driving gear rotatably supported by said apparatus, a first driven gear and a second driven gear rotatably supported by said magazine, and means supported by said magazine for establishing selective driving connection between said driving gear and either said first driven gear or said second driven gear; said means including a shaft, means supporting said shaft alternatively for lateral displacement or rotary movement, and a third driven gear fixedly mounted on said shaft, said third driven gear meshing with said driving gear and being adapted to mesh with said first driven gear at one end and with said second driven gear at the other end of the lateral displacement of said shaft, and said shaft being laterally displaced automatically when the direction of rotation of said driving gear is reversed.

28. In combination, a film magazine adapted to be removably attached to a film-handling apparatus which rotatably supports a driving gear; a driven gear adapted to mesh with said driving gear when said magazine is attached to said apparatus; a first gear and a second gear; and a shiftable gear in driving connection with said driven gear and adapted to mesh with said first gear at one end and with said second gear at the other end of its shift; said driven, first, second and shiftable gears rotatably supported by said magazine.

29. In combination, a film magazine adapted to be removably attached to a film-handling apparatus which rotatably supports a driving gear; a first driven gear and a second driven gear; and a shiftable gear adapted to mesh with said first driven gear at one end and with said second driven gear at the other end of its shift, and adapted to mesh with said driving gear when said magazine is attached to said apparatus; said driven and shiftable gears rotatably supported by said magazine.

30. In combination, a film magazine adapted to be removably attached to a film-handling apparatus which rotatably supports a driving gear, a first spindle and a second spindle rotatably supported by said magazine, and means supported by said magazine and adapted to establish selective driving connection between either said first spindle or said second spindle and said driving gear when said magazine is attached to said apparatus; said means including a rotatably supported driven gear adapted to mesh with said driving gear, and said selection being determined solely by the direction in which said driven gear is rotated.

31. In combination, a film magazine adapted to be removably attached to a film-handling apparatus which rotatably supports a driving gear, a first driven gear and a second driven gear, and gear means adapted to connect selectively either said first driven gear or said second driven gear with said driving gear when said magazine is attached to said apparatus; said driven gears and said gear means rotatably supported by said magazine, said gear means including a gear adapted to mesh with said driving gear, and said selection being determined solely by the direction in which said gear means is rotated.

32. In combination, a film magazine adapted to be removably attached to a film-handling apparatus which rotatably supports a driving gear; a driven gear rotatably supported by said magazine and adapted to mesh with said driving gear when said magazine is attached to said apparatus; a first spindle and a second spindle rotatably supported by said magazine; and means supported by said magazine for establishing selective driving connection between said driven gear and either said first spindle or said second spindle, the selection being determined solely by the direction in which said driven gear is rotated.

33. In combination, a film magazine adapted to be removably attached to a film-handling apparatus which rotatably supports a driving gear, a driven gear rotatably supported by said magazine and adapted to mesh with said driving gear when said magazine is attached to said apparatus, a first gear and a second gear rotatably supported by said magazine, and gear means rotatably supported by said magazine and connecting said driven gear selectively with either said first gear or said second gear, the selection being determined solely by the direction in which said driven gear is rotated.

34. In combination, a film magazine adapted to be removably attached to a film-handling apparatus which rotatably supports a driving gear, a first driven gear and a second driven gear rotatably supported by said magazine, and means supported by said magazine and adapted to establish selective driving connection between either said first driven gear or said second driven gear and said driving gear when said magazine is attached to said apparatus; said means including an arm swinging at one end around a pivot and a third driven gear rotatably supported at the other end of said arm, said third driven gear being adapted to mesh with said driving gear, and with said first driven gear at one end and with said second driven gear at the other end of the swing of said arm, and said arm swinging automatically when the direction of rotation of said driving gear is reversed.

35. In combination, a film magazine adapted to be removably attached to a film-handling apparatus which rotatably supports a driving gear, a first driven gear and a second driven gear rotatably supported by said magazine, and means supported by said magazine and adapted to establish selective driving connection between either said first driven gear or said second driven gear and said driving gear when said magazine is attached to said apparatus; said means including a shaft, means supporting said shaft alternatively for lateral displacement or rotary movement, and a third driven gear fixedly mounted on said shaft, said third driven gear being adapted to mesh with said driving gear, and with said first driven gear at one end and with said second driven gear at the other end of the lateral displacement of said shaft, and said shaft being laterally displaced automatically when the direction of rotation of said driving gear is reversed.

ERIC M. BERNDT.